Feb. 23, 1932.   C. A. NEVINS ET AL   1,846,747
PISTON VALVE AND ACTUATING MECHANISM
Filed Jan. 22, 1929   3 Sheets-Sheet 1
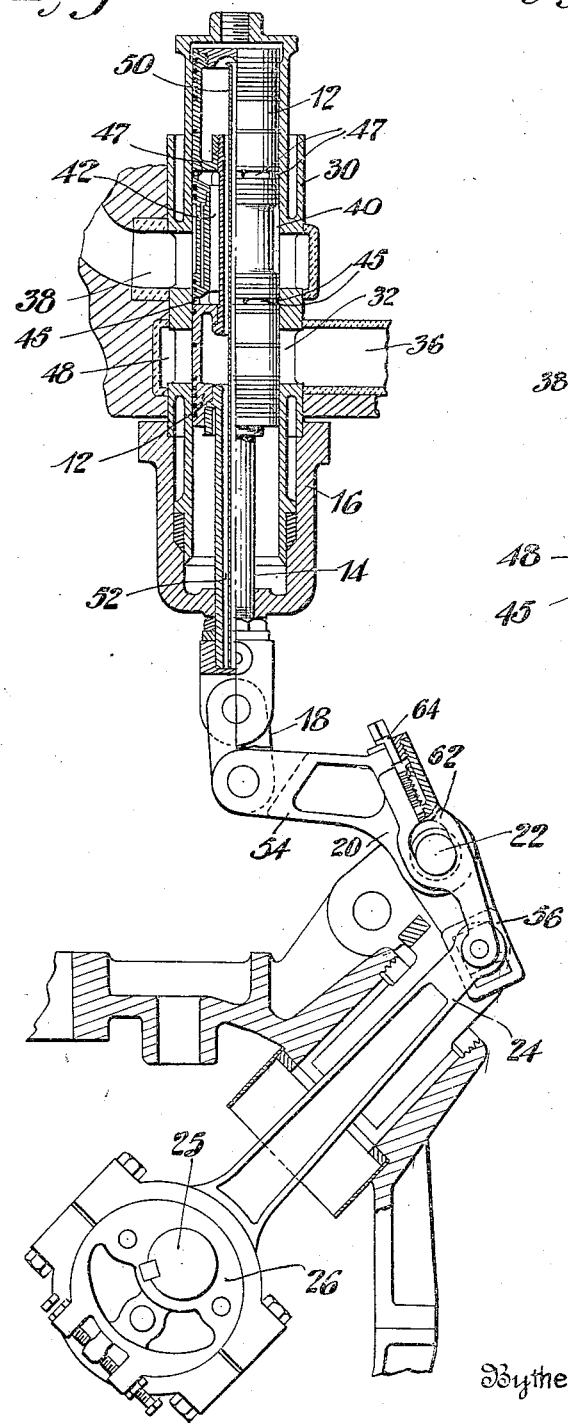
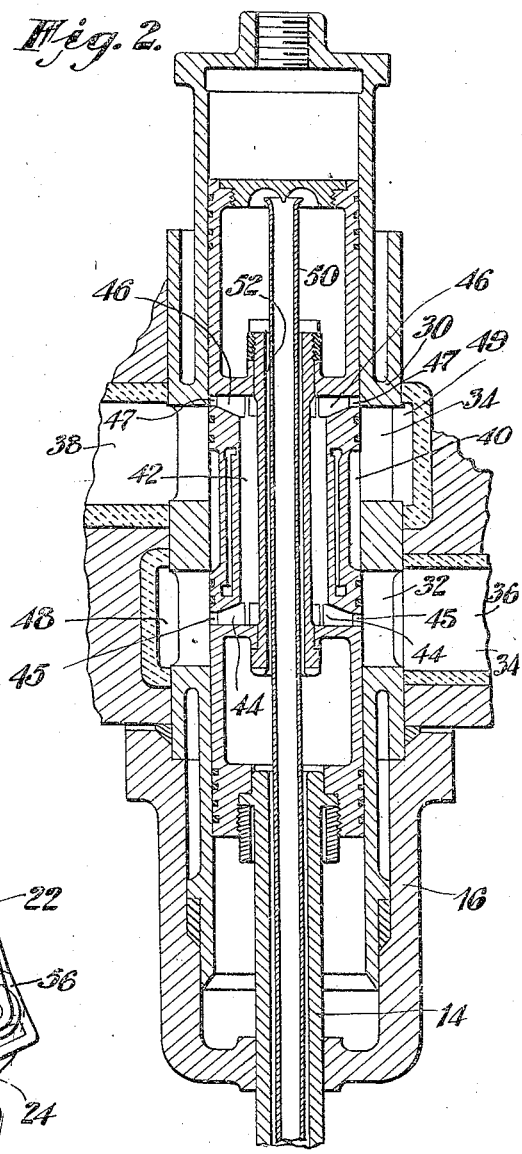
Inventors
CHARLES A. NEVINS
JOHN WRIGHT
By their Attorney Feb. 23, 1932.          C. A. NEVINS ET AL          1,846,747
PISTON VALVE AND ACTUATING MECHANISM
Filed Jan. 22, 1929          3 Sheets-Sheet 2
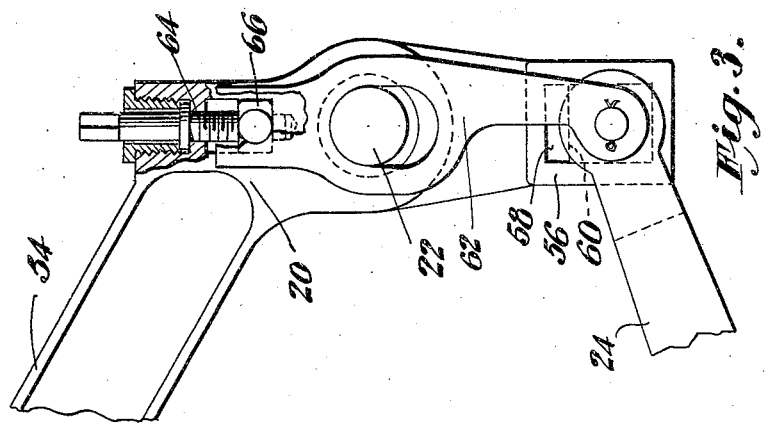
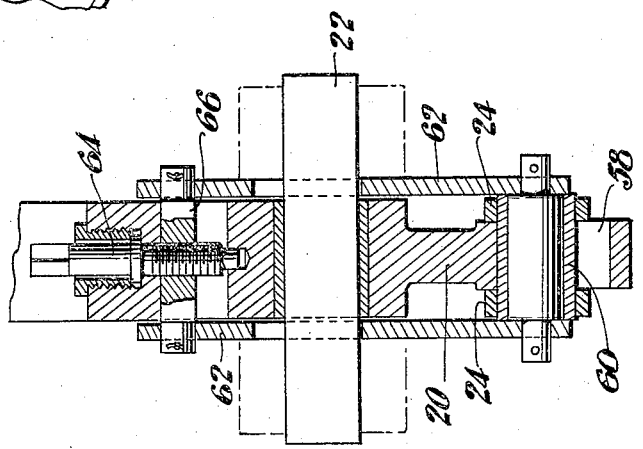
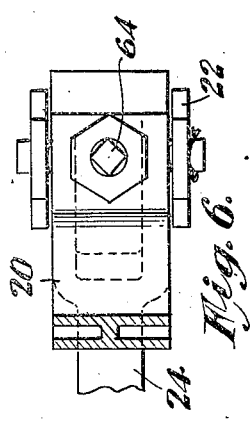
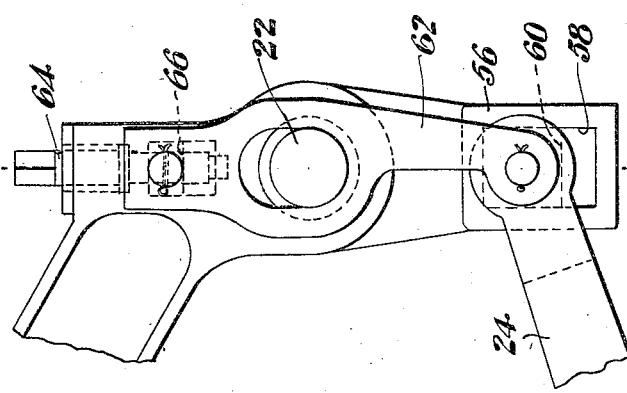
Inventors
CHARLES A. NEVINS
JOHN WRIGHT
By their Attorney
Edmund G. Borden

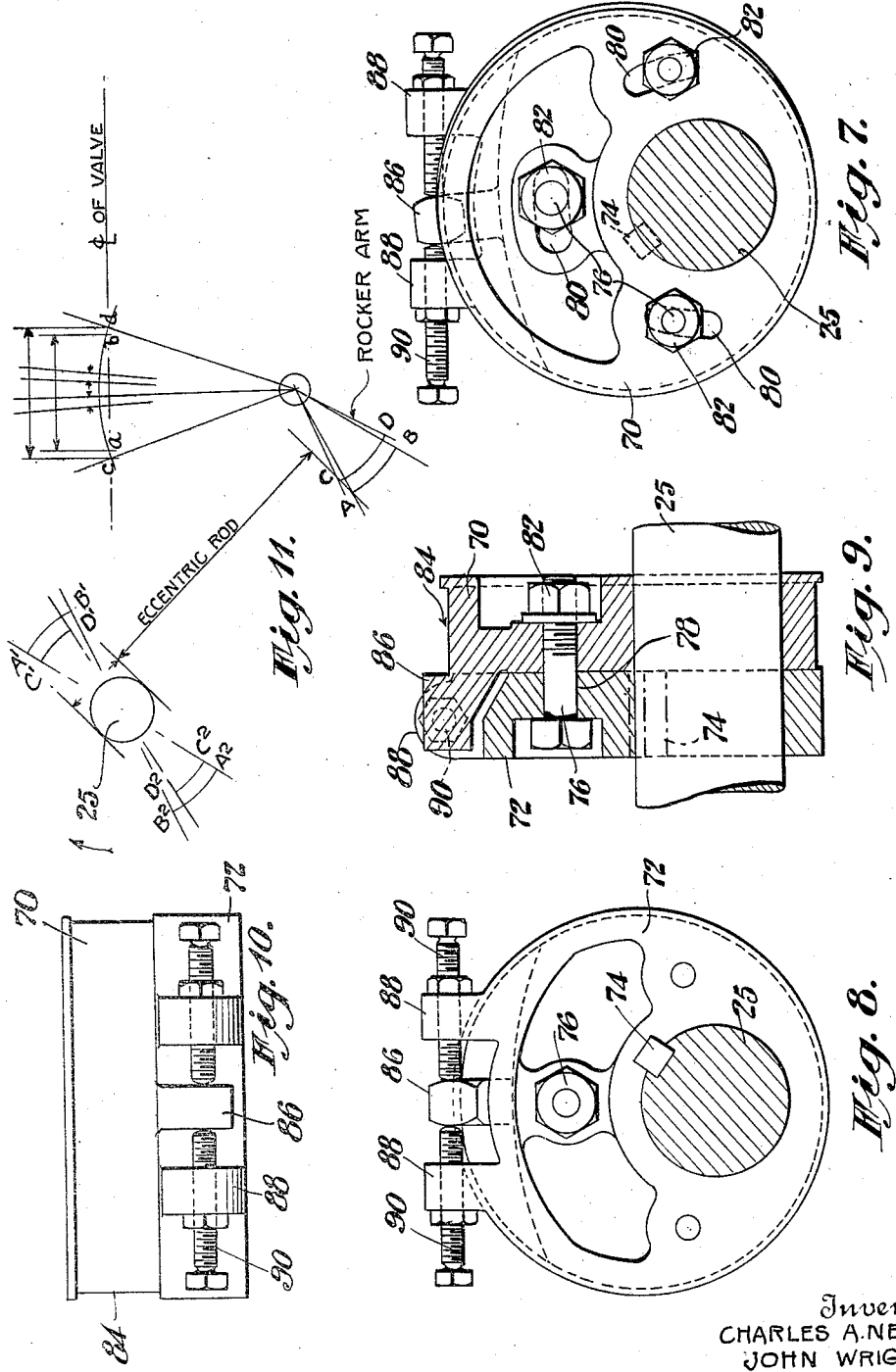

Patented Feb. 23, 1932

1,846,747

UNITED STATES PATENT OFFICE

CHARLES A. NEVINS, OF WHITESTONE, AND JOHN WRIGHT, OF BRONX, NEW YORK, ASSIGNORS TO DOHERTY RESEARCH COMPANY, OF NEW YORK, N. Y., A CORPORATION OF DELAWARE

PISTON VALVE AND ACTUATING MECHANISM

Application filed January 22, 1929. Serial No. 334,312.

This invention relates to a piston valve and an actuating mechanism therefor and has for its principal object to provide a valve which shall be capable of opening and closing within a very few degrees of revolution of the crank shaft of the engine to which the valve is attached.

In engines of the type disclosed in the co-pending application of Henry L. Doherty, Serial No. 97,164, filed March 24, 1926, a charge of highly compressed air is admitted to the combustion space of the engine during the first part of the power stroke. It is essential in order to obtain the efficiency of which these engines are theoretically capable that the valve controlling the admission of the hot compressed air be fully opened within a very brief period. Otherwise there is a serious wire-drawing of the air charge as the same passes to the engine cylinder with a resulting reduction in pressure and consequent loss of power. For this reason piston valves of conventional design are not useful in this position because of their slow opening and closing. Poppet valves also are not readily adaptable for this purpose because if the same are opened with sufficient suddenness the mechanism actuating the valve is subjected to an enormous resistance due to the inertia of the valve and parts of the valve gear. Furthermore if a poppet valve is closed suddenly as is desired in this case, it and the corresponding valve seat are subjected to a hammerlike blow due to the suddenness with which the valve is forced upon its seat.

It is one of the objects of this invention to provide a piston valve construction in which the valve passage shall be opened at a time when the valve is moving at about its highest velocity and in which the rate of opening is greater than the piston velocity, thereby avoiding material wire drawing of air charge, and also providing for an equally rapid closing of the valve permitting a sharp cutoff.

It is a further object of this invention to provide a piston valve which shall be operated to open the passage controlled thereby twice for each revolution of the crank or eccentric driving the same. By this means the velocity with which the valve is actuated is reduced one half and the energy required to drive the valve and valve gearing accordingly decreased.

It is a further object of this invention to provide a means whereby both the time and duration of the opening of the valve may be separately and independently varied.

While the invention will be discussed in connection with the engines of the type described in the above mentioned application to which it is particularly adapted, it will be readily appreciated that the valve herein disclosed is useful in many other positions where it is desired to control the flow of fluids under pressure, particularly hot gaseous products of combustion, and it is a further object of this invention to provide a well cooled piston valve suitable for the control of highly heated gases.

These and other objects of the invention will be more fully described in connection with the accompanying drawings, in which:

Fig. 1 is a side elevation of the piston valve and the actuating mechanism therefor, parts being shown in section;

Fig. 2 is a longitudinal section through the piston valve;

Fig. 3 is an enlarged view of a rocker which constitutes part of the actuating mechanism shown in Fig. 1;

Fig. 4 is a view similar to Fig. 3 but showing the parts in a different position;

Fig. 5 is a sectional view taken on line 5—5 of Fig. 4;

Fig. 6 is an end view of the rocker shown in Fig. 4;

Fig. 7 is a side view of the eccentric used in driving the valve.

Fig. 8 is a view similar to Fig. 7 showing the opposite side of the eccentric;

Fig. 9 is a transverse section through the eccentric, parts being shown in side elevation;

Fig. 10 is a top plan view of the eccentric showing the means for the eccentric timing adjustment, and Fig. 11 is a timing diagram illustrating variations in the throw of the crank arms when the parts are in the two positions shown in Fig. 3 and Fig. 4.

Referring to Fig. 1 the piston valve 12, is connected by means of piston rod 14, which reciprocates through a housing 16, and by link 18, with a bell crank or rocker 20. The bell crank 20 is mounted to oscillate upon the pivot 22. A rod 24 connects one arm of the bell crank 20 with an eccentric 26, adjustable on shaft 25.

The details of the piston valve 12 may be seen in connection with Fig. 2 on which 30 indicates the barrel of a valve cylinder in which the piston 12 reciprocates. The cylinder 30 is provided with two sets of passages 32 and 34 therethrough which connect with inlet and discharge passages 36 and 38. About the central portion of the piston 12 is a reduced portion providing an annular chamber 40. Through the central portion of the piston is an annular passage 42 which provides communication between a series of lower passages 44 and upper passages 46. The passages 44 and 46 extend radially of the piston 12 and terminate in annular ports 45 and 47 in the wall thereof. The passages 36 and 38 extend around the cylindrical member 30 to provide annular chambers 48 and 49 about the ports 32 and 34 respectively to provide free communication between the passages 36 and 38 and all of the passages 32 and 34. The piston rod 14 is hollow to permit the passage of cooling fluid through the piston by means of a tube 50 inserted therethrough. The tube 50 being of smaller diameter than the inner diameter of the piston rod 14, an annular passage 52 is formed for the discharge of the cooling fluid while the intake is provided through the tube 50. Flexible tubing or other equivalent means not shown connects with the lower end of rod 14 for the supply of cooling fluid to the tube 50 and for the discharge of the same from annular passage 52, or vice versa.

In the operation of the piston valve it will be seen that when the valve is in position shown in Fig. 1 the communication between intake passage 36 and discharge passage 38 is completely closed by the piston 12. As the piston valve moves downwardly to the position shown in Fig. 2 the annular port 45 comes in registry with the passages 32, but since the port 47 is not yet in registry with the passages 34, there is as yet no communication between the intake passage 36 and the discharge passage 38. However as the piston valve continues to move downwardly the port 47 registers with passages 34 and communication is thereby established between the intake passage 36 and the discharge passage 38 by means of passages 44, 42 and 46. Simultaneously communication between annular chamber 40 and passages 32 is opened affording a second means of communication between intake passage 36 and discharge passage 38.

It will thus be seen that further downward movement of the piston 12 from the position shown in Fig. 2 opens simultaneously two means of communication between the inlet passage 36 and the discharge passage 38. The cross sectional area of the port opening which is provided by any given movement of the piston is therefore twice that which would be obtained by a similar movement of the piston if only one means of communication were provided.

In closing the ports 45 and 47 and the annular chamber 40 a similar action takes place. As the piston moves downwardly the ports 45 are covered by that portion of the wall of the cylinder 30 which lies immediately below the passages 32. Though the upper port 47 remains in registry with the passages 34 communication between passage 36 and 38 through passage 42 is cut off when the port 45 is no longer in registry with passages 32. Simultaneously the upper end of the annular chamber 40 moves out of registry with the passages 34 so that communication between passages 36 and 38 through either of the two passages 40 or 42 is completely closed. The closing of the total port area therefore proceeds for a given piston velocity twice as fast as if but one of the communicating passages were provided. The annular chamber 40 and the annular ports 45 and 47 are so positioned on the piston 12 that the opening and closing of the ports occurs at about the time that the piston 12 is moving at its highest velocity. This combined with the double port opening provides a construction in which the opening or closing of the valve may take place within but a few degrees of the movement of the crank shaft. It will be understood that, while the annular ports 45 and 47 give the greatest possible port opening during the initial part of the opening period because they extend about the entire circumference of the piston, passages 44 and 46 may terminate in a plurality of ports in the wall of the piston provided the total length of each of these sets of ports approximates the circumference of the same.

The piston 12 continues to move downwardly after closing communication between passages 36 and 38. After reaching its lower dead center position it moves upwardly and at about the middle of its upward stroke the valve is again in open position. This opening on the upward stroke occurs after a rotation of the shaft 25 through 180° from the position in which the valve opened upon its downward stroke. If the engine is a two cycle engine the shaft 25 is driven from the main shaft of the engine by means of two to one gearing so that by the time the shaft 25 has been rotated through 180° the main shaft of the engine will have rotated through 360° and the engine will have completed one cycle. Accordingly the engine will again be in position to receive a charge of air through passages 38 which will be in open communication with the passage 36 in the same way as when the piston 12 was in its mid position on its downward stroke.

In order to provide a means for varying the period during which the valve shall be in open position the rocker 20 is provided with a means for varying the effective length of one of its arms in order to vary the stroke of the piston. Since the time of any complete reciprocation of the piston remains the same by this mechanism, the velocity of the piston is varied and therefore the duration of the period in which the passages 36 and 38 are in open communication is varied.

The means for varying the duration of the period in which the valve is in open position may be seen in detail in connection with Figs. 3, 4, 5 and 6. The rocker 20 is pivoted upon a pin 22. One end 54 is connected with the link 18 as shown in Fig. 1 and the opposite end 56 is provided with a slot 58 in which a block 60 is adapted to slide. The block 60 is connected with a forked end of the rod 24 and also to links 62 which are adjustable by means of screw 64 and nut 66 to move the block 60 to or from the pivot pin 22 of the lever. When the block 60 is in the position shown in Fig. 3, the effective length of arm 56 of rocker 20 is at its maximum. For any given movement of rod 24 the oscillation of arm 54 is at a minimum and accordingly the valve 12 is moved through its shortest stroke. When the parts are in the position shown in Fig. 4, the rod 24 acts upon arm 56 of lever 20 at a point which is closer to the pivot 22 than in Fig. 3 and the piston 12 is thereby actuated through a longer stroke.

Although the length of the stroke of piston valve 12 is thus varied, the time required for the piston to complete one stroke remains the same whether the length of the stroke be long or short. In other words piston 12 will complete a stroke from upper dead center to lower dead center or vice versa during the rotation of shaft 25 through 180° regardless of the adjustment of block 60. Since the time required by piston 12 to make a long stroke remains the same as in the case of a short stroke the velocity of the piston is greater when the mechanism is adjusted for a long stroke than a short one. When the velocity of the piston is thus increased the duration of the period in which the ports 47 are in registry with passages 34 while the ports 45 are also in registry with passages 32 is decreased. Thus the length of time in which the valve is in open position is varied by varying the position of block 60 and thereby the leverage of lever 20. This permits of a variation of the quantity of fluid passing to the engine from passage 36 through the valve and through passage 38.

It is not desirable in engines of the type mentioned to alter the time of commencement of the opening of the valve with every change in the duration of opening. It is important that the time of commencement of opening should remain the same for any given cycle of operation of the engine, and that changes in the duration of opening be manifested in a change in the point of cut off. For example in the Doherty engine referred to in application Serial No. 97,164 the time of opening of the intake valve for the admission of highly heated compressed air to the engine cylinder is preferably when the piston thereof is at upper dead center and it is desirable that this point remain constant, changes in load being effected by changes in the time of cut off without material alteration of the time of opening.

In the device described if only the effective length of the rocker arm 56 were altered the resulting change in the duration of the period in which the valve is open would affect both the point of opening and the point of closing. That is upon increasing the velocity of the piston valve the time of opening would be retarded and the time of closing would be advanced, these two variations together effecting a material change in the duration of the period in which the valve is open. In order to keep the time of opening of the valve substantially constant regardless of changes in duration of opening, the parts are so designed that any shift of block 60 in slot 58 to increase the length of the stroke of valve 12 and therefore decrease the duration of opening, correspondingly shifts the eccentric rod 24 relative to eccentric 26 to advance the timing of the valve to such an extent as to offset or substantially offset the retardation incidental to the decrease in duration of opening.

In Fig. 11 is illustrated, by way of example, a timing diagram which indicates also the variation in the throw of the bell crank arms 24 required to produce the desired variation in duration of opening of the valve. It will be understood that the parts may be so proportioned as to permit a greater range of adjustment if desired. From the diagram it will be seen that when the eccentric shaft 25 is rotated in the direction of the arrow at one half of the speed of the crank shaft for a 2-cycle engine the shaft 25 is so positioned relative to the crank shaft of the engine that, when the piston of the engine is at top dead center, the piston valve will be at approximately mid-stroke. At this point the piston passages will have come into registry with the ports of the supply passage and the fluid will be supplied to the engine. Assuming that the eccentric rod is so adjusted that it acts upon the outermost end of the arm of the bell crank the end of the eccentric rod connected with bell crank will move through the arc AB. The distance through which this end of the crank is moved by the eccentric in this example being two inches the opposite end of the crank is so proportioned as to be moved through a stroke $ab$ of three and one half inches. The piston valve when the parts are in this position will accordingly be actuated through its shortest stroke. Its velocity will therefore be at the lowest for any given speed of rotation of the engine and the period during which the valve will be in open position will be at its greatest. This period is indicated on the diagram by the arc $A'$ $B'$ which indicates the number of degrees that is to say 30° through which the cam shaft of the engine will rotate while the valve is in open position. It will be understood that since the cam shaft for a 2-cycle engine is rotated at one-half the speed of the engine the parts will be open when in this position through a period which, translated to degrees of rotation of the engine crank, is twice that indicated upon the cam shaft.

When the eccentric rod is adjusted to act upon the arm of the bell crank at the point closest to its pivot the end of the eccentric rod attached to the crank moves through an arc CD. The throw of the eccentric remaining constant this arc is of the same length as the arc AB, that is to say two inches. However the leverage of the bell crank having changed, the opposite end of the crank is moved through a stroke $cd$ of four inches and the piston valve is accordingly moved through its longest stroke and therefore at its highest velocity. When the parts are in this position the valve is open during 26° of rotation of the eccentric shaft, the period being indicated by the arc $C'$ $D'$. This arc $C'$ $D'$ would fall intermediate the ends of larger arc $A'$ $B'$ were it not for the fact that in moving the eccentric rod from the position in which the end attached to the bell crank moves through the arc AB to the arc CD, the eccentric rod is shifted about the eccentric shaft in a direction opposite to the rotation of said shaft which thereby advances the timing so that the point of initiation of the opening period, when the parts are in the position which is indicated by $C'$, does not lag behind the point $A'$ but substantially coincides therewith as indicated.

When the eccentric shaft moves through 180° from the point indicated at $A'$ the piston of the engine will again be at top dead center, the crank shaft having moved through 360° and the valve will again be in open position this time upon the upward stroke of the piston valve. The point of initiation of the open period at this time which is indicated at $A^2$ will coincide with the arrival of the working piston at top dead center in the same manner as when the valve piston opened the inlet passage upon its downward stroke. The duration of opening $A^2$ $B^2$ corresponds to the same adjustment of $A'$ $B'$ while points $C^2$ and $D^2$ indicate an adjustment corresponding to $C'$ $D'$.

In order to vary the time in the engine cycle at which the valve is in open position independently of the duration of opening means are provided, which may be seen in detail in Figs. 7, 8, 9 and 10, for varying the position of the eccentric upon the cam shaft of the engine. In these figures 70 indicates a disk eccentrically positioned upon the shaft 25. Adjacent the disk 70 is a similar disk 72 which is keyed to the shaft 25 by key 74. The disk 70 is free to rotate relatively to the shaft 25 but is held to a limited angle of movement by bolts 76 extending through a bore 78 in member 72 and through slots 80 in disk 70. The slots 80 permit angular adjustment of the disk 70 about the shaft 25 so that by loosening the nuts 82, the disk 70 may be shifted within the limited angle permitted by the slots 80. The disk 70 has a trough 84 in which the eccentric strap is adapted to slide and a projection 86 integral thereto and adapted to overlie the member 72. Disk 72 is provided with a pair of projections 88 which are provided with internally screw-threaded bores to accommodate lock screws 90. These screws bearing upon projecting member 86 are adapted to hold the eccentric disk 70 in a fixed position relative to disk 72. Thus when the eccentric disk 70 is once set in a desired position relative to the disk 72 and the nuts 82 tightened any possibility of the eccentric disk 70 slipping in the course of actuation is prevented by the lock bolts 90.

This construction provides a means for varying the time of opening of the valve independently of the duration of opening, and permits the engine to be adjusted to function upon different cycles at the same time insuring that the point of admission of the air charge to the engine shall remain constant for any given setting of the eccentric regardless of the duration of the admission period.

While the invention has been particularly described with relation to engines operating upon the cycle disclosed in the application of Henry L. Doherty, Serial No. 97,164, in connection with which it is particularly advantageous due to its rapid opening and sharp cut off it will be readily seen that the construction herein disclosed possesses utility in other applications.

Although a specific embodiment of the invention has been described, it will be obvious to those skilled in the art that various modifications may be made in the details of construction and in the design and proportion of the several co-operating parts without departing from the principles herein set forth.

Having thus described the invention, what is claimed as new is:

1. In an engine a piston valve for controlling the flow of working fluid to the engine, means to change the time in the engine cycle at which said valve is in open position, and separate means to control the duration of the period in which said valve is open.

2. In an engine a piston valve for controlling the flow of working fluid to the engine, means to change the time in the engine cycle at which said valve is in open position without altering the duration of opening, and separate means for changing the duration of the period in which the valve is open without altering the point in the engine cycle at which said opening is initiated.

3. A device for controlling the supply of motive fluid to a fluid pressure engine including a piston, a cylinder, eccentric driven mechanism for reciprocating said piston in said cylinder, said cylinder having two sets of passages about the circumference thereof, one set connecting with a source of fluid under pressure and the other with a cylinder of the engine, said piston having two sets of ports about the circumference thereof, one set being adapted to register with the set of cylinder passages connecting with the source of fluid under pressure, and the other set being adapted to register with the set of cylinder passages connecting with the cylinder of the engine, a passage through the piston connecting the two sets of piston ports and forming when said piston ports are in registry with said cylinder passages a means of communication between said source of motive fluid and said engine cylinder, an annular channel about the circumference of said piston between the two sets of piston ports and adapted to form with the wall of said cylinder an annular passage and forming a second means of communication between said source of motive fluid and said engine cylinder, said piston ports and said annular channel being so disposed upon the piston as to come into registry with the passages in said cylinder simultaneously whereby the port area during the initial opening period is substantially equal to the distance traversed by the piston during the period multiplied by the circumference of said piston.

4. In combination a piston valve for controlling the flow of fluids from a source of supply to the cylinder of a fluid pressure motor, a plurality of passages formed in said piston adapted to form a plurality of separate means of communication between said source of supply and said engine cylinder when said piston is in the middle of its stroke.

5. In combination a piston valve for controlling the flow of fluids from a source of supply to the cylinder of a fluid pressure motor, a plurality of passages formed in said piston adapted to form a plurality of separate means of communication between said source of supply and said engine cylinder when said piston is in the middle of its stroke and means whereby said passages are opened simultaneously.

6. In combination a piston valve for controlling the flow of fluids from a source of supply to the cylinder of a fluid pressure motor, a plurality of passages formed in said piston adapted to form a plurality of separate means of communication between said source of supply and said engine cylinder when said piston is in the middle of its stroke, said passages being so disposed as to open simultaneously about the entire circumference of said piston whereby the total port area through which fluid may pass from the source of supply to the engine cylinder increases at a rate which is greater than the rate of travel of the piston.

7. In combination a piston valve for controlling the flow of fluids, a plurality of annular channels about the circumference of the piston, said channels forming a plurality of ports adapted to open simultaneously whereby the port area during the initial opening period of the valve is equal to at least twice the distance traversed by the piston during the period multiplied by the circumference of said piston.

8. A piston valve for controlling the flow of fluids, a passage through said piston, an annular channel about the circumference thereof, said passage and said channel forming two separate means for conducting the fluid controlled, past said piston valve.

9. A device for controlling the supply of motive fluid to a fluid pressure engine including a piston and cylinder, said cylinder having two sets of passages about its circumference, one set connecting with the supply of fluid under pressure and the other with a cylinder of the engine, said piston having two sets of ports opening into annular channels about its circumference, one of said channels being adapted to register with the set of cylinder passages connected with the supply of fluid under pressure, and the other being adapted to register with the set of cylinder passages connected with the cylinder of the engine, a passage through the piston connecting the two sets of piston ports and forming when said channels are in registry with said cylinder passages a means of communication between said source of motive fluid and said engine cylinder, said piston having a third channel about its circumference between said first mentioned channels and adapted to form a second means of communication between said source of supply and said engine cylinder which opens simultaneously with the opening of the first mentioned means of communication.

10. A device for controlling the supply of fluid to an internal combustion engine at a predetermined point in the cycle thereof, comprising a piston, means to reciprocate said piston, a passage in said piston terminating in ports about the circumference thereof, said ports being adapted to register with a passage leading to a supply of fluid during the reciprocation of said piston, means to alter the quantity of fluid supplied to the engine by altering the velocity with which the ports in said piston traverse said passage, and means for altering the timing of the piston simultaneously with each alteration of the velocity thereof to substantially offset resulting changes in the point in the cycle of the engine at which the supply of fluid is initiated.

11. A device for controlling the supply of fluid to a fluid pressure engine including a passaged piston, a cylinder having ports in the circumference thereof, means to reciprocate said piston in said cylinder, and means to alter the velocity with which said piston traverses said ports while the engine is in operation to alter the quantity of fluid supplied to the motor.

12. In combination a piston valve, actuating mechanism therefor, means to alter the duration of the period in which the valve is open, and means adapted to alter the timing of the valve simultaneously with alterations in the duration of opening to maintain constant the point at which the valve begins to open.

13. In combination, a piston valve for controlling the flow of fluids from a source of supply to the cylinder of a fluid pressure motor, a plurality of passages formed in said piston adapted to form a plurality of separate means of communication between said source of supply and said engine cylinder and means whereby said passages are opened simultaneously.

In testimony whereof I affix my signature.
CHAS. A. NEVINS.
In testimony whereof I affix my signature.
JOHN WRIGHT.